Oct. 23, 1956     D. O. SCHWENNESEN ET AL     2,768,231
LEAD-IN CONSTRUCTION
Filed March 30, 1951     2 Sheets-Sheet 1
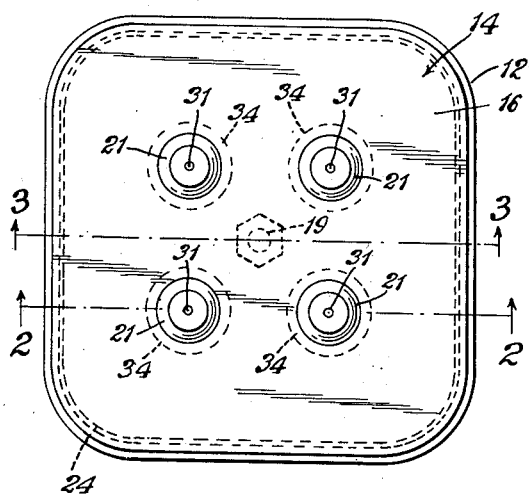
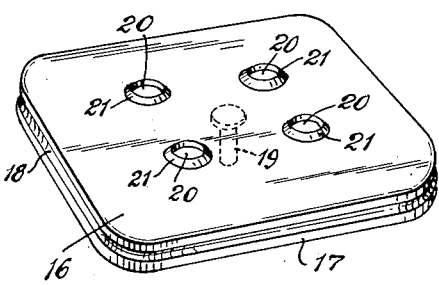
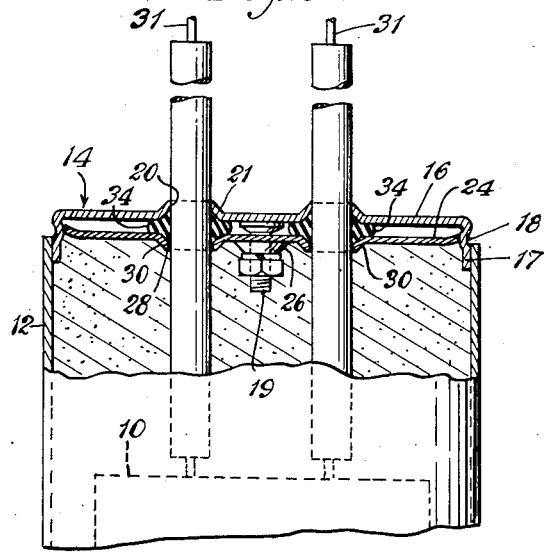
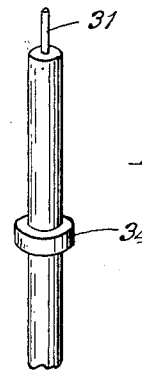
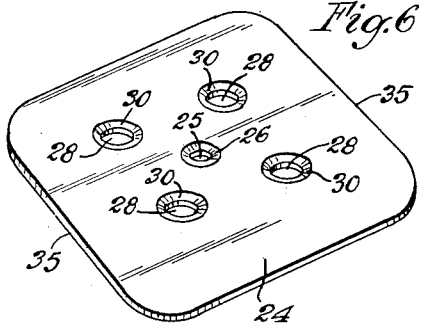
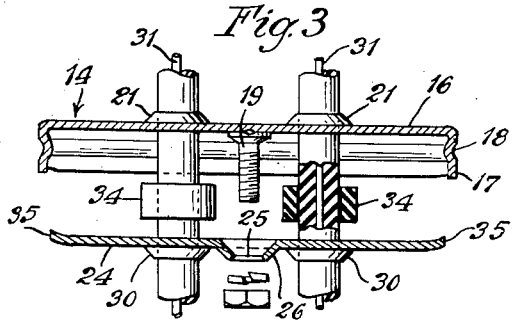
Inventors
Donald O. Schwennesen
Arni Helgason
by Robert L. Kahn
Attorney Oct. 23, 1956 D. O. SCHWENNESEN ET AL 2,768,231
LEAD-IN CONSTRUCTION
Filed March 30, 1951 2 Sheets-Sheet 2
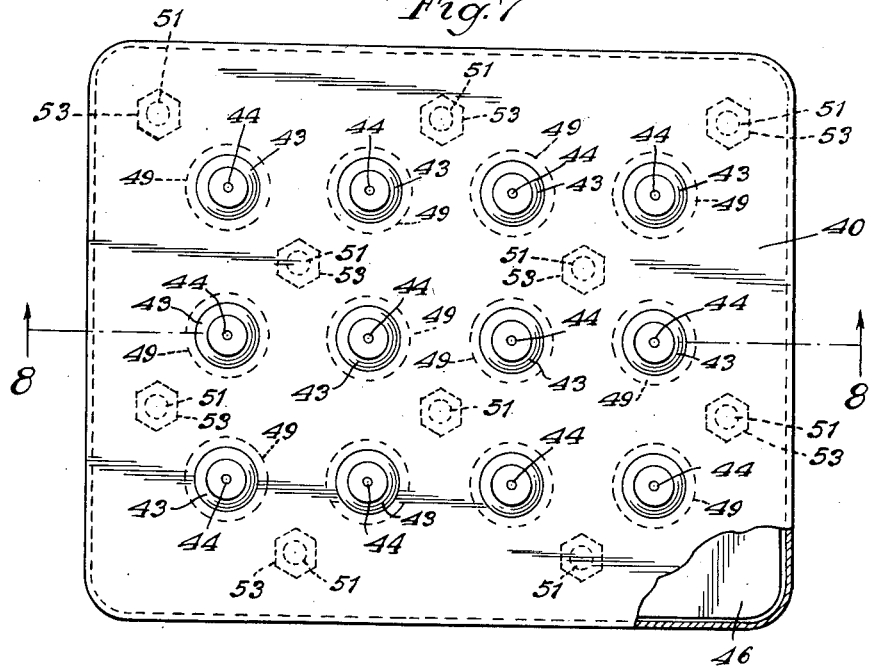
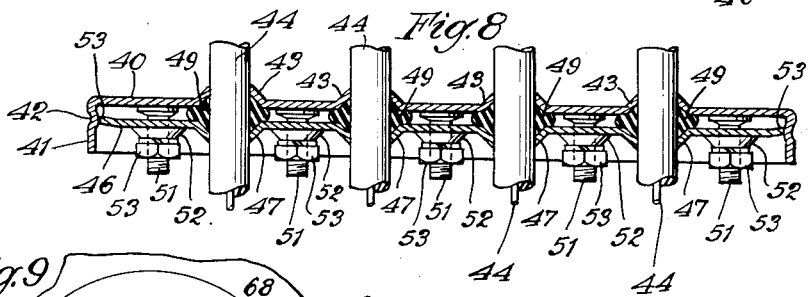
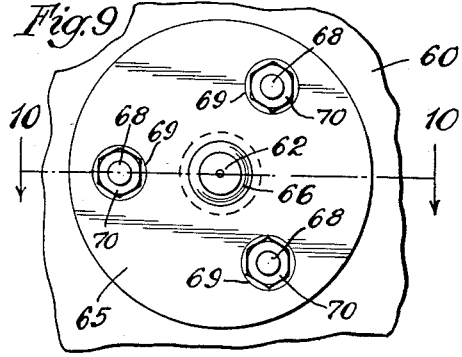
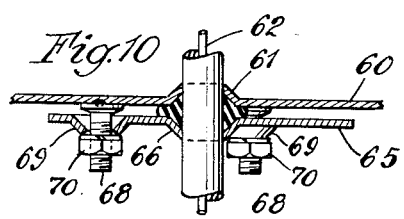
Inventors
Donald O. Schwennesen
Arni Helgason
by Robert L. Rahn
Attorney.

United States Patent Office 2,768,231
Patented Oct. 23, 1956

2,768,231

LEAD-IN CONSTRUCTION

Donald O. Schwennesen, Chicago, and Arni Helgason, Wilmette, Ill., assignors to Essex Wire Corporation, a corporation of Michigan Application March 30, 1951, Serial No. 218,378

1 Claim. (Cl. 174—18)

This invention relates to a lead-in construction and particularly to a construction for use with small or medium size electrical devices that are to be hermetically sealed. While the lead-in construction hereinafter described may be generally applied, a preferred application is for use with such devices as transformers or capacitors that are to be disposed in metallic or other rigid casings.

Electrical devices such as transformers or capacitors are frequently operated at high potential under climatic extremes. Thus many such devices are operated in the tropics where high temperature and high humidity conditions prevail. Such devices when disposed in aircraft may operate under the above described tropical conditions at one time and at other times under conditions of extreme cold, reduced atmospheric pressure and low or high humidity as the case may be. Thus a transformer or condenser operating at high potentials may be adequately insulated against breakdown for normal temperatures and atmospheric pressures in the temperate zone whereas the same piece of apparatus may break down or flash over at high altitudes or in other parts of the world, such as for example in the tropics.

Inasmuch as apparatus of this type, particularly when used in aircraft, may be called upon to operate under greatly varying temperature and climatic conditions, it is desirable to provide a construction which will permit such a device to operate satisfactorily. In addition to the above condition, it is desirable that such apparatus be economically manufactured, be susceptible to ready service and replacement and in addition, be rugged so that rough usage will not impair the utility of the device.

In accordance with this invention, a structure is provided which satisfies the above conditions to a high degree. The structure embodying the present invention is economical, involves no expensive parts or elaborate tooling for quantity production, has no tendency to interfere with normal production technique of such electrical devices as transformers or capacitors, particularly the disposition of such devices in cases, provides a construction which may be opened for repair or replacement of part or all of the device and makes it possible to reseal the device with minimum of time, trouble and tools.

Exemplary embodiments of the invention will now be described in connection with the drawings, it being understood, however, that these embodiments may be varied within substantial limits without departing from the spirit of the invention. Referring, therefore, to the drawing;

Figure 1 shows a top plan view of a construction embodying the present invention;

Figure 2 is a side sectional elevation along line 2—2 of Figure 1;

Figure 3 is a sectional elevation along line 3—3 of Figure 1 with the parts in exploded form;

Figure 4 is a perspective view of the top plate of the construction shown in Figures 1 to 3 inclusive;

Figure 5 shows a perspective view of a lead-in for use in the construction embodying the present invention;

Figure 6 shows a perspective view of the bottom plate of the construction illustrated in Figures 1 to 3 inclusive;

Figure 7 shows a top plan view of a modified form of the invention wherein a large number of lead-ins are provided;

Figure 8 is a sectional view along line 8—8 of Figure 7;

Figure 9 is a detail from the bottom of a still further modified form of the invention showing an individual lead-in seal construction;

Figure 10 is a sectional view along line 10—10 of Figure 9.

Referring first to Figures 1 to 6 inclusive, 10 indicates an electrical device such as a transformer, capacitor, or any other device having a number of connections, here shown as four. Device 10 is normally disposed in casing 12 of metal or rigid material. Device 10 will usually be disposed in oil, wax or other insulating material in casing 12, this being known as potting and being well known in the electrical art.

Casing 12 may have any desired shape and will have the top open, said opening being adapted to cooperate with a cover construction to be described in detail later but generally indicated by numeral 14.

The cover together with the lead-ins and device 10 may be assembled as a unitary structure and lowered into position in casing 12. Under certain conditions, as when device 10 is heavy, a frame rigidly uniting cover 14 and device 10 may be provided. Or it is possible to position device 10 in casing 12 first, leave enough slack in the lead-ins to permit soldering the lead-ins to the terminals of device 10 and thereafter close cover 14 on casing 12. Cover 14 is sealed to casing 12 and this cover has the wire lead-ins for the device hermetically sealed as these lead-ins pass through the cover.

Cover 14 is preferably made of metal, such as sheet steel suitably galvanized or cadmium plated, or may be of brass, copper or any other metal suitable for the purpose. In the event that casing 12 and cover 14 are of steel, the casing and top may be joined together by soldering, or any other means to insure a strong mechanical joint and hermetic seal.

The cover construction, generally indicated by numeral 14, comprises top plate 16 having its edge portions bent to form flanges 17. Flanges 17 are crimped inwardly at 18. Cover 14 fits over casing 12 with flanges 17 snugly fitting along the casing rim. The plate may be designed to have flanges 17 overlie the casing rim. As shown, flanges 17 fit along the inside edge of the casing rim. Thus the channel formed on the outside by crimp 18 will provide a suitable region for flowing solder to seal the cover and casing.

Top plate 16 has, at the inside surface thereof, at least one bolt 19 extending downwardly from the plate. Bolt 19 is rigidly attached at the center or any suitable part of the top plate by soldering, spot welding or any other suitable means, it being understood that the means or method of attachment shall in no way impair the sealed character of the plate surface. Top plate 16 has suitable apertures 20 therein for accommodating lead-in wires. Each aperture will accommodate one lead-in wire so that the number of apertures required will depend upon the number of lead-in wires necessary. As shown here, the apparatus requires four wires so that four apertures are provided. Inasmuch as the lead-in construction is the same, only one will be described in detail.

Thus referring specifically to Figure 2, aperture 20 is round and of a size to accommodate the insulated lead-in wire snugly. The metal of the plate at the edge of the aperture is forced upwardly as shown in Figure 2, thus providing embossed portion 21. It is preferred to have portion 21 as an embossing although this may be reversed if desired to provide a depressed portion, as seen from the top face of plate 16.

Cooperating with top plate 16 is bottom plate 24, preferably also of metal and shaped to lie within the top plate. Bottom plate 24 has aperture 25 which registers with bolt 19 in the assembled condition of the structure. Apertured portion 25 is bounded by depressed or well portion 26. As is clearly evident, the various embossed or depressed portions are formed by forcing or extruding the metal in the direction shown, the metal itself preferably retaining its general normal thickness.

Bottom plate 24 is also provided with apertures 28 normally registering with and of the same size as apertured portions 20 of the top plate. Thus referring particularly to one apertured portion, 28 is bounded by well-shaped or depressed portion 30, the metal of the bottom plate extending downwardly or in the reverse direction of corresponding embossed portion 21 in the top plate. It is also possible to provide an embossing in the bottom plate instead of a depressed portion so that two apertured portions of the top and bottom plates cooperate with each other and will approach toward each other rather than extend away from each other. Or it is possible to have embossings or depressed portions on both plates, as seen from the top. The arrangement shown, however, is preferred, this providing the maximum sealing action.

Each lead-in wire consists of conductor 31 which is usually of copper. Conductor 31 is solid wire. Stranded wire is usually objectionable because of leakage between wires along the length thereof. Conductor 31 carries heavy insulation consisting of flexible material. Preferably, the insulation consists of rubber. Thus for example, one type of insulation which has been successfully used consists of Buna rubber with an outer coating of neoprene rubber as a jacket. Thus the wire insulating will withstand moisture, grease and various other liquids and materials which might ordinarily attack natural rubber.

The outer diameter of the insulation is so selected that the insulated wire can be pulled through an aperture in the top or bottom plates with some difficulty. Thus during pulling the insulation through an aperture, some elongation of the insulation occurs, this resulting in a reduction in diameter of the insulation in the immediate neighborhood of the apertured portion of the plate. Carried by each insulated wire is sleeve 34 of rubber, also, preferably of neoprene, although other types of rubber may be used. Sleeve 34 is thick enough (along the wire length) so that when the sleeve is disposed around the insulated wire between the top and bottom plates, the sleeve or washer may be compressed.

Bottom plate 24 is dimensioned so that at least two opposite edges 35 will reach inside faces of flanges 17, when the two plates are assembled. The inward crimping of flanges 17 will require the bottom plate to be sprung into the position shown in Figure 2. In this position, edges 35 of the bottom plate are between crimp 17 and the body of top plate 16. Crimped portions 17 will thus anchor edges 35 of the bottom plate. All four edges of bottom plate 24 may fit snugly within the flanges of top plate 16 so that the four edges will require springing into position.

As is clearly evident from the drawings, the centers of the top and bottom plates are forced together by a nut on bolt 19 after the bolt has passed through bottom plate 24. Thus when the two plates are drawn together, sleeve 34 will be tightly compressed. The edges of bottom plate 24 will thus be firmly anchored.

The disposition of the sleeve material when the plates are forced together is shown in Figure 2. Thus with portions 21 and 30 oppositely disposed away from each other as shown, compression of sleeve 34 results in forcing the sleeve material inwardly around the outside of the insulation of the lead-in between the two plates. Thus a large area around the insulation is gripped by sleeve 34 to provide a seal which is tight against gas or liquid. The extended area of contact between sleeve 34 and the parts of the top and bottom plates contacted by the sleeve will provide a tight seal. It is clear that a high degree of tolerance in dimensions is permissible in the construction disclosed.

In forming apertures 20 and 28, it is preferred to have the inside edge of the metal contacted by the insulation smooth so that a band contact between the metal and insulation is provided. However, if desired, the edge of the metal at the aperture in both the top and bottom plates may be shaped to a sharp edge in which case the insulation should be large enough so that the edge of the metal bites into the insulation to provide a continuous line of contact. This latter construction, however, may have some disadvantages particularly when the insulated leads may be pulled or bent in which case some cracking or cutting of the insulation might occur. More flexible insulation would be required so that the insulation could be worked along the plate.

A structure embodying the present invention as shown in Figure 2, for example, when properly assembled will result in the insulated lead-ins being gripped so tightly that it will not be possible ordinarily for a lead-in to be pulled through the top construction. Even if the wire is moved, the seal will still be maintained so that any forcible shifting of the wire longitudinally with respect to the top construction will result in no change of the character of the seal.

Referring now to Figures 7 and 8, a modified form of construction is shown wherein a large number of leads are provided. In this modification, top plate 40 having flanged portions 41 with crimped regions 42 in the flanges are provided, all this being generally similar to the corresponding top plate in Figures 1 to 6 inclusive. A number of embossed regions 43 are provided, these regions being suitably apertured and each having lead-in 44 extend through the apertured portion thereof. Bottom plate 46 also has regions 47 which are apertured and embossed as seen from the bottom. From the top, it is clear that region 47 is a depressed or well-shaped portion. Sleeves 49 similar to sleeve 34 are provided for the insulated lead-in.

Top plate 40 carries a number of bolts 51 rigidly attached to the bottom face thereof. Bolts 51 extend through suitably apertured portions in the bottom plate, these apertured portions being similar to apertured portion 25 in bottom plate 24 of the modification shown in Figures 1 to 6 inclusive. Nuts 53, threaded on bolt 51, cooperate with embossings 52, as seen from the bottom of the bottom plate, to force the bottom plate against the top plate.

As seen in Figure 7, the cover construction as a whole has a substantial number of lead-ins distributed over the surface of the cover structure. In order to maintain compression throughout the various lead-ins, any desired pattern of bolts, such as shown in Figure 7 for example, may be provided. Crimped portion 42 in flange 41 may be utilized for locking edge 53 of the bottom cover plate in a manner similar to the structure previously described. This wedging action between the edge of the bottom plate and the crimped part of the top plate may be dispensed with if a suitable number of bolts along the edge of the cover are provided. In general, the location and number of the bolts will depend in a substantial manner upon the gauge of metal used for both the top and bottom plates of the cover, the amount of compression on the sleeves and similar factors. If desired, washers cooperating with the nuts on the bolts may be used to reinforce the bottom plate over a large area. Such washers may be generally dished to resemble the embossings.

It is also possible to provide a structure embodying the present invention wherein the bottom plate of the cover is reduced in size to a washer. Such a construction may be used where only one lead-in is required or where a more massive construction is desirable.

Thus, referring to Figures 9 and 10, top plate 60 has apertured embossed portion 61 through which insulated lead-in 62 passes. Instead of the customary bottom plate as described in the constructions shown in Figures 1 to 8 inclusive, there is provided an abbreviated bottom plate or washer 65 having apertured portion 66 as an embossing when seen from one side thereof. Bottom plate 65 may have any desired shape and, as shown here, is shaped as a large washer. Top plate 60 carries a number of bolts 68, these bolts passing through corresponding apertured embossed portions 69 in the bottom plate or washer. Nuts 70 cooperating with bolts 68 serve to draw the two plate portions together. As shown here, each lead-in has three bolts distributed symmetrically around the same, these three bolts serving to pull or draw bottom plate or washer 65 tightly against the top plate. The entire washer may be dished if desired.

As many of such lead-ins as shown in Figures 9 and 10 may be provided as may be deemed desirable. Such a construction may lend itself to a rather massive case where it is unnecessary or undesirable to have a bottom plate forming part of the cover extending the entire area of the top plate. As many bolts may be provided as necessary to obtain desired compression of the sleeve around the insulation of the wire.

While it is preferred to have the nuts and bolts extending between the top and bottom plates as shown, it is clear that the cover construction as a whole may be reversed so that the nuts and bolts are on the outside of the casing when the cover is installed. It may be desirable to spot-weld or solder the top and bottom plates or washer instead of using bolts and nuts. In such case, the two parts will have to be compressed during the welding or soldering and care will have to be taken to prevent overheating the insulation and sleeve.

What is claimed is:

A lead-in construction for electrical apparatus including a metallic casing having a rim, said construction comprising cooperating top and bottom plates, said plates having registering apertures for each lead-in wire, the plate material around each aperture being shaped to provide an embossing, opposed embossings extending away from each other, an insulated lead-in for one pair of registering apertures, said lead-in having the insulation thick in comparison to the diameter of the conductor and the outer diameter of the insulation being such that the insulated wire can just be pulled through the aperture in each plate, the apertured portions in the two plates being substantially similar, a flexible insulating sleeve around said insulated wire, said sleeve having a uniform bore and hugging the wire insulation tightly throughout its length and being disposed for compression between said two plates, the outer plate having the edges bent to form flanges adaped to fit against the inside of the rim portion of said casing, said flanged portions being embossed inwardly thereof along the length of said flange, the embossed part being normally positioned near the casing rim, said inner plate having such a dimension that the edges thereof must be sprung to get them over the crimping so that said crimping anchors the edges against plate separation and at least one bolt carried by one plate and extending through a suitable aperture in the other plate and nut cooperating with said bolt for forcing said two plates together, said sleeve being long enough and having a wall thick enough so that, upon sleeve compression, the sleeve material fills the opposed embossings and extends beyond the embossings to provide a seal and the outer plate being soldered to the rim of the casing, the flanged portion of the outer plate that is embossed inwardly along the length of said flange promoting a good soldered joint between the outer plate and casing rim.

References Cited in the file of this patent

UNITED STATES PATENTS

| | | |
|---|---|---|
| 63,505 | Gray | Apr. 2, 1867 |
| 1,541,756 | Williams | June 9, 1925 |
| 1,788,261 | Werder | Jan. 6, 1931 |
| 2,417,552 | Ilker et al. | Mar. 18, 1947 |
| 2,451,516 | Skobel | Oct. 19, 1948 |
| 2,586,892 | Weber et al. | Feb. 26, 1952 |

FOREIGN PATENTS

| | | |
|---|---|---|
| 336,362 | Great Britain | Aug. 16, 1930 |